Feb. 17, 1953  W. P. LEWIS  2,629,064
COMMUTATOR AND METHOD OF FORMING THE SAME
Filed Dec. 8, 1950
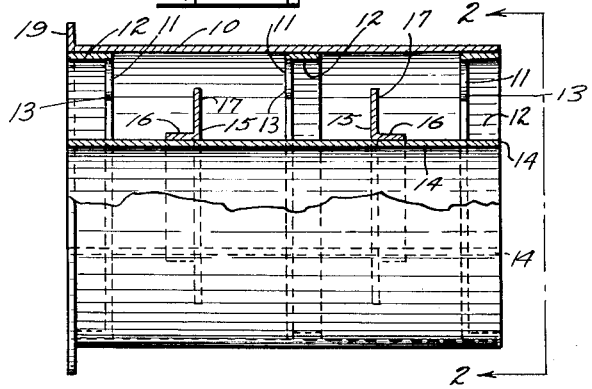
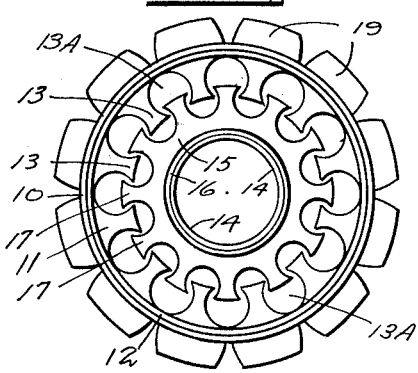
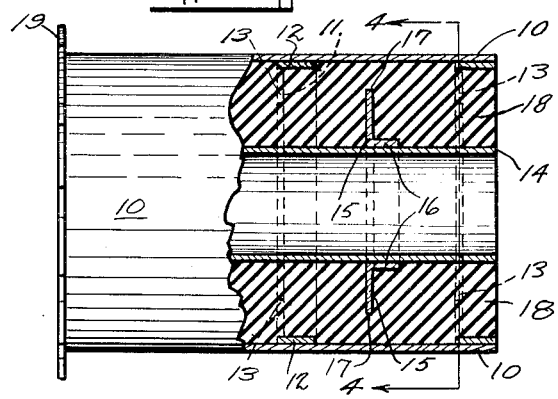
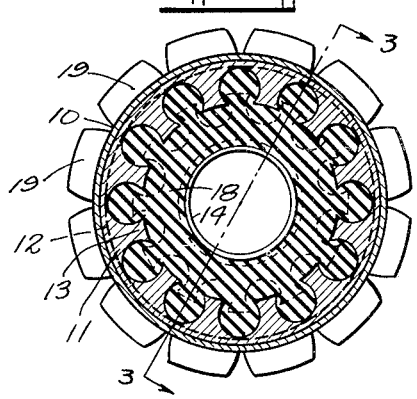
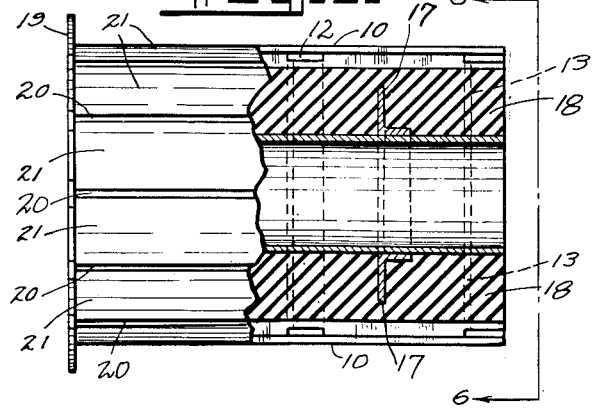
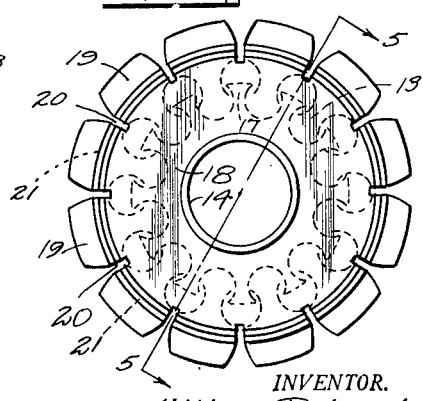
INVENTOR.
William P. Lewis.
BY
W. B. Harpman
ATTORNEY.

Patented Feb. 17, 1953

2,629,064

UNITED STATES PATENT OFFICE 2,629,064

COMMUTATOR AND METHOD OF FORMING THE SAME

William Purcell Lewis, Alliance, Ohio

Application December 8, 1950, Serial No. 199,797

4 Claims. (Cl. 310—235)

This invention relates to a commutator such as employed in an electric motor and more particularly to a commutator of extremely light weight construction.

The principal object of the invention is the provision of a commutator of light weight construction including a plurality of thin, circumferentially spaced segments of conductive material anchored in a moulded core in such a manner that they are incapable of shape distortion due to centrifugal force as occasioned by rotating the commutator at high speed.

A further object of the invention is the provision of an improved commutator which overcomes the problem of weight and centrifugal distortion occurring in commutators hereintofore known in the art.

A still further object of the invention is the provision of a commutator including a bushing formed integrally therewith and contributing to the structural unity of the said commutator.

A still further object of the invention is the provision of a commutator of the moulded core type having a plurality of thin, light weight, radially spaced sections of conducting material so arranged in the commutator structure that they are able to resist distortion from centrifugal force when the commutator is rotated at very high speeds.

The commutator disclosed herein is particularly adapted for use in electric motors operating at high speeds and wherein lightness of weight is a desirable feature both from the point of view of eliminating distortion of the contact members of the commutator and also from the over-all weight of the commutator and motor.

In modern aircraft each additional pound or fraction of a pound of weight contributes to the tendency of the aircraft to respond slowly in turns from a straight path whether such turns be to one side or the other or downwardly or upwardly with respect to the intial path of the aircraft. At speeds approaching the speed of sound, each pound of weight in the aircraft adds uncalculated distance to the problem of control particularly when the course of the aircraft is changed and, as known in the art, substantial numbers of electric motors are commonly employed in such high speed aircraft for operating various control means thereof, etc., all of which add to the dead-weight of the aircraft and contribute their part to the above mentioned slowness of response in diverting the aircraft from a given course. The solution of the problem of forming a light weight commutator, itself efficient in its indicated job and in its ability to resist distortion due to centrifugal force when rotated at high speeds, in thus even more important when it is considered that numbers of such high speed electric motors are used in high speed aircraft with the savings in weight contributing to the efficient operation and control of the aircraft.

One of the objects of the present invention is, therefore, the provision of a commutator of extremely light weight construction which is at the same time capable of withstanding a centrifugal force and hence distortion which would render the commutator and the motor in which it was a part inoperative.

With the foregoing and other objects in view which will appear as the description proceeds, the invention resides in the method of forming the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a side elevation of a partially completed commutator with parts broken away and parts in cross section.

Figure 2 is an end elevation taken on line 2—2 of Figure 1.

Figure 3 is a side view of an incomplete commutator with parts in cross section and parts broken away.

Figure 4 is a cross section taken on line 4—4 of Figure 3 and section lines on Figure 4 indicate the section of Figure 3.

Figure 5 is a side elevation of a completed commutator with parts broken away and parts in cross section.

Figure 6 is an end view taken on line 6—6 of Figure 2. Section lines 5—5 on Figure 6 indicate the section of Figure 5.

By referring to the drawings and Figures 1 and 2 in particular it will be seen that the metal structure of the commutator eventually forms both the plurality of radially spaced electrical conductor sections on the surface of the commutator and the means for anchoring the same in the moulded core as later applied to the construction. The metal structure of the commutator comprises a thin walled cylindrical body 10 formed of such material as thin wall copper tubing or thin sheet-like material and provided with a plurality of spaced anchor rings 11—11. Each of the anchor rings 11 includes a flange 12, the outer surface of which is cylindrical and of a size to fit snugly within the cylindrical body 10. The anchor rings 11—11 are best illustrated in Figure 2 of the drawings and may be seen to comprise cut-out discs provided with a plurality of inwardly flared lugs 13. The inwardly flared lugs 13 in the anchor rings 11—11 are formed by blanking out a plurality of circular openings 13A radially spaced with one another in the metal of the anchor ring 11. An alternate anchor ring construction may be formed from strip material blanked with a plurality of longitudinally spaced openings and sections of strip material being formed in a circle and positioned in the cylindrical body 10 to form annular anchor rings 11—11 as shown.

The subsequent application of the core, as shown in Figures 3 and 4 of the drawings, results in embedding the plurality of radially spaced lugs 13 therein so that the cylindrical body 10 is held firmly thereby.

Still referring to Figures 1 and 2 of the drawings it will be seen that a bushing is positioned within and longitudinally of the cylindrical body 10, the bushing being indicated by the numeral 14, and is formed of suitable material such as thin wall copper tubing and is positioned in the finished commutator by secondary anchor rings 15 which are provided with right angle flanges 16. The secondary anchor rings 15 have a plurality of radially spaced flared lugs 17 formed thereon by the formation of a plurality of radially spaced circular openings therein, as best shown in Figure 2 of the drawings. In the preferred construction, as illustrated in Figures 1 and 2 of the drawings, the bushing 14 is provided with a pair of the secondary anchor rings 15 which are spaced midway between the anchor rings 11 heretofore referred to. The radially spaced flared lugs 17 on the secondary anchor rings 15 are shown in Figures 1 and 2 of the drawings as they would appear prior to the formation of the moulded core in the commutator.

In Figures 3 and 4 of the drawings the moulded core is shown in position and the same is indicated by the numeral 18. By referring to Figures 3 and 4 of the drawings it will be seen that the moulded core fills the space between the exterior of the bushing 14 and the interior of the cylindrical body 10 so that the anchor rings 11 and the secondary anchor rings 15 on the cylindrical body 10 and bushing 14, respectively, are completely embedded in the core 18. It will be observed that the spacing of the two secondary anchor rings 15 with respect to the anchor rings 11 eliminates any possibility of electrical contact therebetween as the core 18 is formed of dielectric material.

In Figures 1, 2, 3 and 4 of the drawings soldering lugs 19 are shown positioned on one end of the cylindrical body 10, the same being formed integrally therewith or as a separate part of the assembly electrically connected therewith as desired. In the latter event a plurality of the soldering lugs 19 may be formed in a shape comparable with one of the anchor rings 11 and added to the assembly prior to the forming of the moulded core 18 therein. Alternately, they may be formed as radially spaced extensions on one of the anchor rings 11. In either event, they are used in the finished commutator to provide the necessary electrical connections to the segments of the commutator which are formed as illustrated in Figures 5 and 6 of the drawings by longitudinal cutting of the body 10 at points between the radially spaced lugs and about the circumference of the body 10 to form slots 20 as shown in Figures 5 and 6 of the drawings.

It will be observed by those skilled in the art that the commutator thus disclosed may be rapidly and inexpensively fabricated from light weight, easily handled parts, the several metallic sections being brazed or otherwise affixed to one another and positioned in desired relation to one another and the core 18 moulded directly therein to form the composite article. The cutting of the longitudinal slots 20 between the predetermined radially spaced lugs on the circumference of the cylindrical body 10 forms the commutator contact sections which are indicated in Figures 5 and 6 of the drawings by the numerals 21. The location of the slots 20 correspond with the radially spaced openings in the anchor rings 11, as best shown in Figure 6 of the drawings, so that each of the segments 21 of the commutator comprises a thin longitudinally extending contact section anchored to the moulded core 18 of the commutator by three of the lugs 13 which prevent it from altering its shape when the commutator is rotated at high speeds. As the contact sections 21 are formed of extermely thin metal, there is a minimum of weight to be acted on by centrifugal force when the commutator is rotated at high speeds and there is therefore but little tendency for the contact sections 21 to distort and such tendency as may occur is overcome by the multiplicity of the anchoring means.

The commutator thus meets the several objects of the invention in that the extremely light weight of the contact sections 21 are able to successfully resist centrifugal force by reason of their relative lack of weight and at the same time the anchoring means insures against such distortion. As compared with commutators known in the art wherein a relatively heavy bar-like contact strip is commonly employed, the advantages of the herein disclosed construction will be readily apparent. The necessity of anchoring the contact strips by inturned end sections thereof is eliminated and elimination of such heretofore commonly used inturned end anchor means eliminates the metal and hence the weight thereof from the finished commutator.

It will thus be seen that the commutator disclosed meets the several objects of the invention.

Having thus described my invention, what I claim is:

1. The method of making a light-weight commutator comprising forming of thin stiff sheet metal a cylindrical body of predetermined length and diameter, disposing within the body rings of thin stiff sheet metal having side flanges about their outer marginal portions and firmly securing the flanges to the inner surface of the body to rigidly mount the rings in the body with one ring located substantially midway the length of the body and other rings adjacent opposite ends of the body, the said rings being each formed with circumeferentially spaced lugs extending toward the axis of the body, disposing about a tubular sleeve of thin stiff sheet metal a plurality of thin stiff sheet metal rings having side flanges about their inner marginal edges firmly secured to the sleeve and rigidly mounting the said rings upon the sleeve in spaced relation to each other, thrusting the sleeve and its rings into the body through an end thereof, the rings of the sleeve being of a diameter greater than the inner diameter of the body rings but less than the inner diameter of the body and disposed between the rings of the body in spaced relation thereto and to the body and each being formed with circumferentially spaced lugs disposed in staggered relation to the lugs of the rings carried by the body and passed through spaces between the rings of the body as the sleeve and its rings are thrust longitudinally into the body, pouring insulating material into the body about the sleeve and allowing the said insulating material to solidify between and about the rings carried by the body and the sleeve, and then cutting the casing and its rings longitudinally of the casing the full length thereof between the lugs of its rings and thereby dividing the casing into bars each carrying lugs anchored in the insulation.

2. The method of making a commutator comprising forming of thin stiff sheet metal a cylindrical body, disposing rings of thin stiff sheet metal within the body and firmly securing outer marginal portions of the rings to the inner surface of the body and thereby rigidly mounting the rings within the body in spaced relation to each other longitudinally of the body, the rings of the body being each formed with circumferentially spaced lugs extending towards the axis of the body, disposing rings of thin stiff sheet metal about a sleeve of thin stiff sheet metal and firmly securing inner marginal portions of the said rings to the sleeve to rigidly mount the said rings about the sleeve in spaced relation to each other longitudinally thereof, thrusting the sleeve and its rings as a unit longitudinally into the body to a position disposing the rings of the sleeve between and in spaced relation to the rings of the body, the rings of the sleeve being of a diameter greater than the inner diameter of the body rings but less than the inner diameter of the body and provided with lugs which are passed through spaces between lugs of the body rings as the sleeve is thrust longitudinally into the body, filling the interior of the body about the sleeve with insulation and allowing the insulation to solidify and form a core in which the rings of the sleeve and the body are embedded and insulated from each other, and then forming the body and its rings with circumferentially spaced slits extending longitudinally of the body the full length thereof and dividing the body into a plurality of bars insulated from each other and each carrying inwardly projecting lugs constituting anchoring members embedded in the core of insulation.

3. A commutator comprising a cylindrical body having thin walls formed of stiff sheet metal, thin rings in said body formed of thin stiff sheet metal and spaced from each other longitudinally thereof and having outer marginal portions formed with side flanges firmly secured to the walls of the body, said rings being formed with lugs extending toward the longitudinal axis of the body and spaced from each other circumferentially of the rings, a tubular sleeve of thin stiff sheet metal extending longitudinally through said body in concentric spaced relation thereto, thin rings formed of stiff sheet metal fitting tightly about said sleeve radially thereof and having inner marginal portions formed with side flanges rigidly secured to the sleeve and being spaced from each other longitudinally of the sleeve, the last mentioned rings being disposed in staggered transversely spaced relation to the rings of the body and formed with circumferentially spaced lugs extending radially of the sleeve in overlapping relation to the rings of the body and disposed in staggered relation to the lugs thereof, a mass of solidified insulation filling spaced within the body about the sleeve with portions of the insulation passing through and filling spaces between the lugs of the rings carried by the body and by the sleeve, and said body and the rings carried thereby being formed with slits extending longitudinally of the body the full length thereof and spaced from each other circumferentially of the body and dividing the body into a multiplicity of transversely spaced contact sections entirely insulated from each other and each carrying longitudinally spaced lugs.

4. A commutator comprising a cylindrical body having thin walls formed of stiff sheet metal, thin rings formed of stiff sheet metal rigidly mounted in said body and spaced from each other longitudinally thereof, said rings being formed with circumferentially spaced lugs extending toward the longitudinal axis of the body, a tubular sleeve of thin stiff sheet metal extending longitudinally through said body centrally thereof, thin rings formed of stiff sheet metal rigidly mounted about said sleeve and spaced from each other longitudinally thereof and disposed in spaced relation to the rings of the body and formed with circumferentially spaced lugs disposed in staggered relation to the lugs of the first rings, a mass of insulation filling space within the body about the sleeve with the rings carried by the body and the sleeve embedded therein and said body and the rings carried thereby being formed with slits extending longitudinally of the body the full length thereof and spaced from each other circumferentially of the body and dividing the body into a multiplicity of contact sections entirely insulated from each other and each carrying longitudinally spaced lugs.

WILLIAM PURCELL LEWIS.

REFERENCES CITED

The following references are of record in the file of this patent:

UNITED STATES PATENTS

| Number | Name | Date |
|---|---|---|
| 435,504 | Lieb | Sept. 2, 1890 |
| 1,875,204 | Apple | Aug. 30, 1932 |
| 1,991,046 | Bohli | Feb. 12, 1935 |
| 2,060,260 | Spengler | Nov. 10, 1936 |
| 2,236,257 | Borchers | Mar. 25, 1941 |
| 2,449,309 | Moeller | Sept. 14, 1948 |
| 2,451,500 | Le Greid | Oct. 19, 1948 |